(12) United States Patent
Sommer

(10) Patent No.: US 11,582,389 B2
(45) Date of Patent: Feb. 14, 2023

(54) ELECTRICAL TRACES IN SUSPENSION ASSEMBLIES

(71) Applicant: Apple Inc., Cupertino, CA (US)

(72) Inventor: Phillip R. Sommer, Newark, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 17/398,956

(22) Filed: Aug. 10, 2021

(65) Prior Publication Data

US 2022/0053136 A1 Feb. 17, 2022

Related U.S. Application Data

(60) Provisional application No. 63/064,312, filed on Aug. 11, 2020.

(51) Int. Cl.

| | | |
|---|---|---|
| *H04N 5/232* | (2006.01) | |
| *G03B 5/04* | (2021.01) | |
| *H04N 5/225* | (2006.01) | |
| *G03B 13/36* | (2021.01) | |
| *G02B 7/09* | (2021.01) | |

(Continued)

(52) U.S. Cl.
CPC ........... *H04N 5/23287* (2013.01); *G02B 7/09* (2013.01); *G02B 27/646* (2013.01); *G03B 5/04* (2013.01); *G03B 13/36* (2013.01); *H04N 5/2253* (2013.01); *H04N 5/2254* (2013.01); *G03B 2205/0069* (2013.01); *H02K 41/0356* (2013.01)

(58) Field of Classification Search
CPC ............. H04N 5/23287; H04N 5/2253; H04N 5/2254; G02B 7/09; G02B 27/646; G02B 7/08; G02B 26/005; G03B 5/04; G03B 13/36; G03B 2205/0069; G03B 2205/0007; G03B 2205/0053; G03B 3/10; G03B 5/00; G03B 30/00; H02K 41/0356; H01B 13/00; H01B 5/14

See application file for complete search history.

(56) References Cited

U.S. PATENT DOCUMENTS

| | | | |
|---|---|---|---|
| 7,679,647 B2 * | 3/2010 | Stavely | G03B 17/02 |
| | | | 348/208.99 |
| 7,807,508 B2 | 10/2010 | Oganesian et al. | |

(Continued)

FOREIGN PATENT DOCUMENTS

| | | |
|---|---|---|
| CA | 2850811 | 6/2015 |

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

A camera may include at least one suspension assembly as part of optical image stabilization and/or autofocus systems of the camera. The suspension assembly may include an inner frame, an outer frame, and one or more flexure arms. Electrical traces may be deposited at both sides of the suspension assembly. A connection may be created, for electrical traces at the different sides of the suspension assembly, through the suspension assembly by removing (e.g., using an etching process) one or more parts in the body of the suspension assembly to create one or more cavities. A remaining part of the suspension assembly surrounded (and thus isolated) by the cavities may thus form at least a part of the connection for the electrical traces. The connection may further include one or more filled trenches connecting the electrical traces to the remaining part of the suspension assembly.

20 Claims, 7 Drawing Sheets

(51) Int. Cl.
*G02B 27/64* (2006.01)
*H02K 41/035* (2006.01)

(56) References Cited

U.S. PATENT DOCUMENTS

| | | |
|---|---|---|
| 8,514,308 B2 | 8/2013 | Itonaga et al. |
| 9,048,354 B2 | 6/2015 | Park et al. |
| 2009/0085143 A1 | 4/2009 | Park |
| 2016/0259177 A1* | 9/2016 | Ladwig ................ G02B 27/646 |
| 2018/0350729 A1* | 12/2018 | Mei ......................... H01L 24/24 |
| 2019/0141248 A1* | 5/2019 | Hubert ............... H04N 5/23287 |
| 2019/0355654 A1 | 11/2019 | Xu et al. |

* cited by examiner

US 11,582,389 B2

ELECTRICAL TRACES IN SUSPENSION ASSEMBLIES

This application claims benefit of priority to U.S. Provisional Application Ser. No. 63/064,312, entitled "Electrical Traces in Suspension Assemblies," filed Aug. 11, 2020, and which is incorporated herein by reference in its entirety.

BACKGROUND

Technical Field

This disclosure relates generally to suspension assemblies in a camera, in particular, techniques for creating electrical traces in suspension assemblies.

Description of the Related Art

The advent of mobile multipurpose devices such as smartphones, tablet or pad devices has resulted in a need for bigger lenses such as ultra- or super-wide lenses for integration in cameras of the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to external excitation/disturbance by adjusting location of the optical lens on the X and/or Y axis in an attempt to compensate for unwanted motion of the lens.

Figure 1:
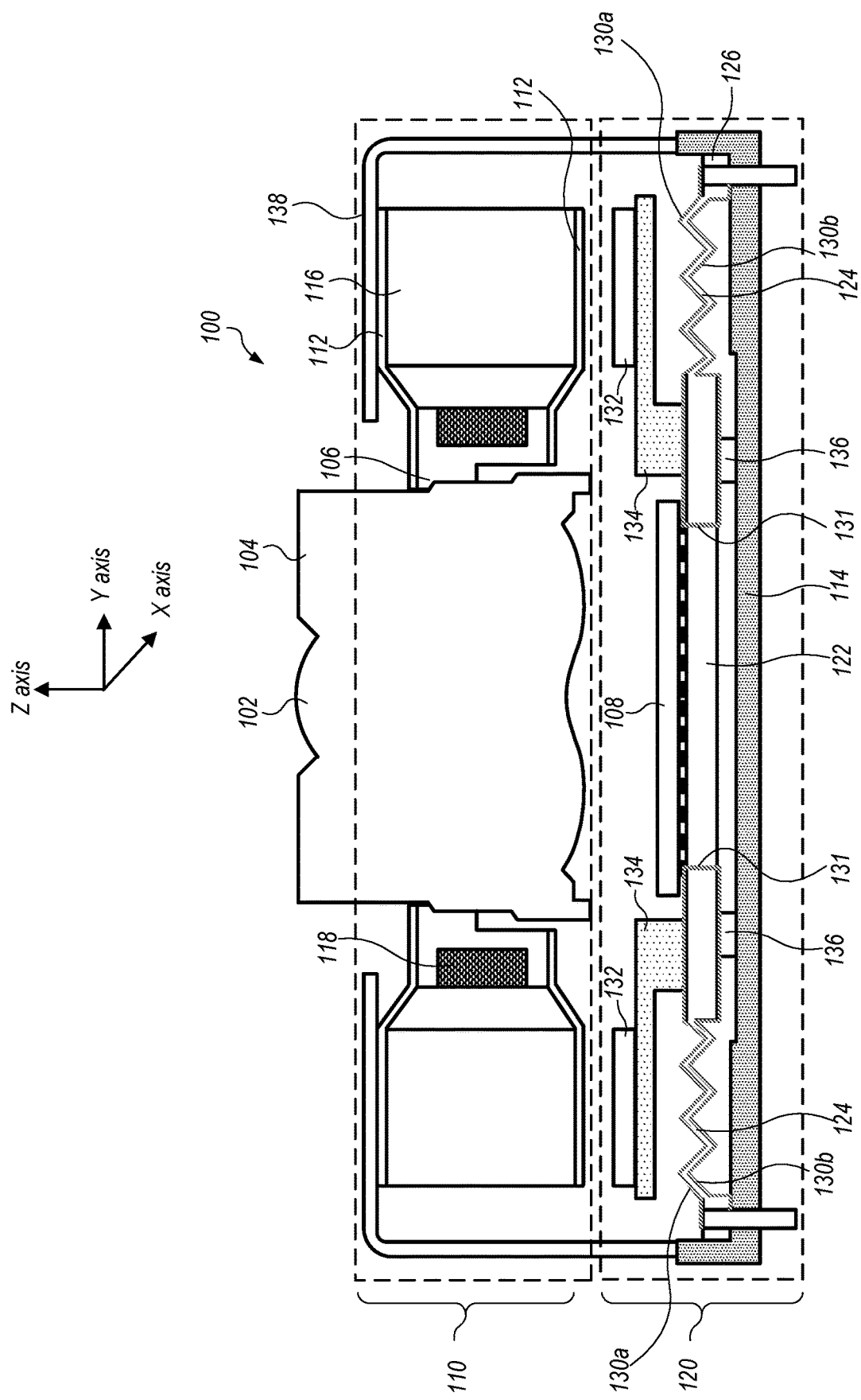
FIG. 1 an example camera which may include a suspension assembly having electrical traces, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the"

are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

In various embodiments, techniques for creating electrical traces in a suspension assembly of a camera are disclosed herein. In some embodiments, the suspension assembly may be part of autofocus (AF) and/or optical image stabilization (OIS) systems of the camera, which may allow optical lens(es) and image sensor of the camera to move relative to each other. For instance, a suspension assembly may be included as part of an OIS system of the camera, where the suspension assembly may include an image sensor inner frame (or a dynamic platform) connected to an outer frame (or a static platform) through one or more flexure arms. The image sensor may be mounted to the inner frame, whilst the outer frame may be fixed with respect to an enclosure of the camera. Thus, the suspension assembly may provide necessary mechanical stiffness as well as flexibility to allow the inner frame, together with the image sensor, to move relative to the optical lens(es) of the camera in one or more directions (e.g., along X and/or Y axes relative to the Z axis or optical axis of the optical lens(es)). The motion of the image sensor relative to the optical lens(es) may be used to implement OIS functions. Similarly, the suspension assembly may be used as part of the AF system, e.g., to provide the movability of the optical lens(es) relative to the image sensor in one or more directions (e.g., along the Z axis or optical axis) to implement autofocus functions.

In some embodiments, it may be desired to integrate electrical traces with the suspension assembly. For instance, electrical traces may be attached to the inner frame, outer frame, and/or flexure arms of the suspension assembly. The combination of the electrical traces and suspension assembly may reduce spaces between components inside the camera. This may reduce the overall footprint of the camera, or provide extra spaces for other components of the camera (e.g., extra spaces for using a larger image sensor). For instance, electrical traces may be added at one or both sides of a flexure arm to serve as a power delivery channel (e.g., to supply power to the image sensor) or signal transfer link (e.g., to transfer signals between the image sensor and an "external" processor). In some embodiments, the electrical traces may be added using an additive manufacturing process. For instance, an electrically conductive material may be deposited at one or both sides of the inner frame, outer frame, and/or flexure arms to form the electrical traces. In some embodiments, the suspension assembly itself (including the inner frame, outer frame, and/or flexure arms) may include an electrically conductive material (e.g., one or more copper alloys). Therefore, the inner frame, outer frame, and/or flexure arms of the suspension assembly may further include at least one electrical insulator layer, e.g., an insulator layer comprising polyamide, ajinomoto build-up film (ABF) and/or other dielectric materials, to provide electrical insulation between the electrical traces and flexure arm.

When the electrical traces are added at both sides of the suspension assembly (e.g., the inner frame, outer frame, and/or flexure arms), it may be necessary to have one or more electrical connections between the electrical traces. Traditionally, electrical connections between electrical traces on different layers (e.g., at two opposite sides of a flexure arm) can be implemented using vertical interconnect accesses (or vias). Generally, a via includes pads on each layer connecting to the electrical traces. The pads are further connected by a hole through the flexure arm. Because the flexure arm itself can be electrically conductive, the hole needs to be isolated from the flexure arm first, and then electroplated with an electrically conductive material (e.g., to form a conductive tube or barrel). The pads, together with the conductive hole, thus form the via between the electrical traces. The creation of vias can be a time consuming and costly manufacturing process, especially in constrained routing spaces, e.g., through thin foils such as flexure arms, where high precision is necessarily required. This way of creating connections may not fit a mass-production manufacturing process.

Therefore, the techniques disclosed herein may use a different process to create connections between electrical traces at different sides (e.g., a first electrical trace at a first side and a second electrical trace at a second side which may be opposite the first side) of a suspension assembly. The techniques may include removing (e.g., by etching) one or more parts of the suspension assembly, e.g., at a specified location between electrical traces, to create one or more cavities. A remaining part of the suspension assembly surrounded (and thus insulated) by the cavities (e.g., in the shape of a cylinder, a hourglass, a rectangular prism, or other shapes), which may include the electrically conductive material (e.g., the one or more copper alloys) of the suspension assembly, may become a "bus bar" (insulated by the cavities) between the electrical traces. In some embodiments, the cavities surrounding the bus bar may be further filled with one or more dielectric materials to further protect and/or insulate the bus bar. In addition, when the suspension assembly includes an insulator layer between the flexure arm and the electrical traces, the techniques disclosed herein may further include creating one or more trenches through the insulator layer, e.g., at both sides of the suspension assembly at locations corresponding to the bus bar. An electrically conductive material may be added (e.g., using an additive deposition process) to fill the trenches such that the filled trenches connect the bus bar (surrounded by the cavities) to form an electrical connection between the electrical traces at the different sides of the suspension assembly. In some embodiments, the forming of electrical traces (at flexure arms) and filling of the trenches may be implemented as part of the same additive manufacturing process. Therefore, compared to the traditional approach based on vias, the disclosed techniques can provide a more efficient manufacturing process which can result in time and cost savings. In addition, the disclosed techniques may provide improved precision and quality controls.

FIG. 1 illustrates an example camera which may include a suspension assembly having electrical traces, according to some embodiments. In the example as shown in FIG. 1, camera 100 may include optical lens 102 inside lens assembly 104 which may be packaged in lens carrier 106. In some embodiments, camera 100 may include image sensor 108 for producing image data (e.g., represented by electrical signals) based on light captured by and transmitted from optical lens 102. In some embodiments, camera 100 may include axial motion voice coil motor 110. Axial motion voice coil motor 110 may include a suspension assembly having one or more flexure arms 112 for moveably mounting optical lens carrier 104 to base 114, where base 114 may be mechanically fixed to enclosure 138 of camera 100. In some embodiments, axial motion voice coil motor 110 may include one or more magnets 116 mounted to base 114, and one or more focusing coils 118 fixedly mounted to lens carrier 106 and mounted to base 114 through flexure arms 112. In some embodiments, focusing coils 118 may carry currents which may interact with the magnetic field of magnets 116 to generate motive forces (e.g., Lorentz forces). With flexure arms 112, the motive forces may allow lens assembly 104 containing optical lens 102 to move relative to image sensor 108, e.g., along an optical axis or Z axis of optical lens 102, thus implementing autofocus (AF) functions for camera 100.

In some embodiments, camera 100 may further include transverse motion voice coil motor 120. Transverse motion voice coil motor 120 may include image sensor inner frame 122 (which may be a dynamic platform), a suspension assembly including one or more flexure arms 124 for mechanically connecting image sensor inner frame 122 to image sensor outer frame 126 (which may be a static platform) of transverse motion voice coil motor 120, and one or more optical image stabilization (OIS) coils 132 moveably mounted to image sensor inner frame 122 (e.g., through flexible printed circuit 134). In some embodiments, OIS coils 132 may be positioned within the magnetic fields of magnets 116, and thus may cause the production of motive forces (e.g., Lorentz forces). In some embodiments, camera 100 may include bearing surface end stop 136 mounted to base 114 for restricting motion of image sensor inner frame 122 (and image sensor 108) along an optical axis of optical lens 102 (e.g., Z axis). Thus, with flexure arms 124, the motive forces caused by OIS coils 132 may move image sensor inner frame 122, together with image sensor 108, relative to optical lens 102 in one or more directions (e.g., along X and/or Y axes) orthogonal to the optical axis of optical lens 102 (e.g., Z axis), thus implementing OIS functions for camera 100.

In some embodiments, besides serving as mechanical connections, electrical traces may be integrated with the AF and/or OIS suspension assemblies of camera 100. For purposes of illustration, taking flexure arms of the AF and/or OIS suspension assemblies as an example, electrical traces may be attached to flexure arms 112 (of axial motion voice coil motor 110) and/or 124 (of transverse motion voice coil motor 120) for purpose of power and/or signal transfers. For example, one or more electrical traces 130a and 130b may be added at one or both sides of flexure arms 124 to (1) deliver power from a power supply to image sensor 108 (and/or OIS coils 132) and/or (2) transfer signals between image sensor 108 and a processor, where the power supply and/or processor may be located inside or external of camera 100. In some embodiments, the AF and/or OIS suspension assemblies, e.g., flexure arms 112 and/or 124, may be made from metal, e.g., one or more copper alloys, to provide required mechanical stiffness, and thus there may be at least one insulator layer, e.g., an insulator layer comprising polyamide, ABF, and/or other dielectric materials, between flexure arms 112 and/or 124 and their attached electrical traces (e.g., electrical traces 130a and 130b) to provide insulation between the AF and/or OIS suspension assemblies with the attached electrical traces. In some embodiments, there may be one or more connections through the body of the AF and/or OIS suspension assemblies for connecting electrical traces at different sides of the suspension assemblies. As shown in FIG. 1, for instance, camera 100 may include connections 131, e.g., through inner frame 122 at or near one or more conductor pads of inner frame 122, to connect electrical traces 130a and 130b at the different sides of the OIS suspension assembly.

Figure 2A:
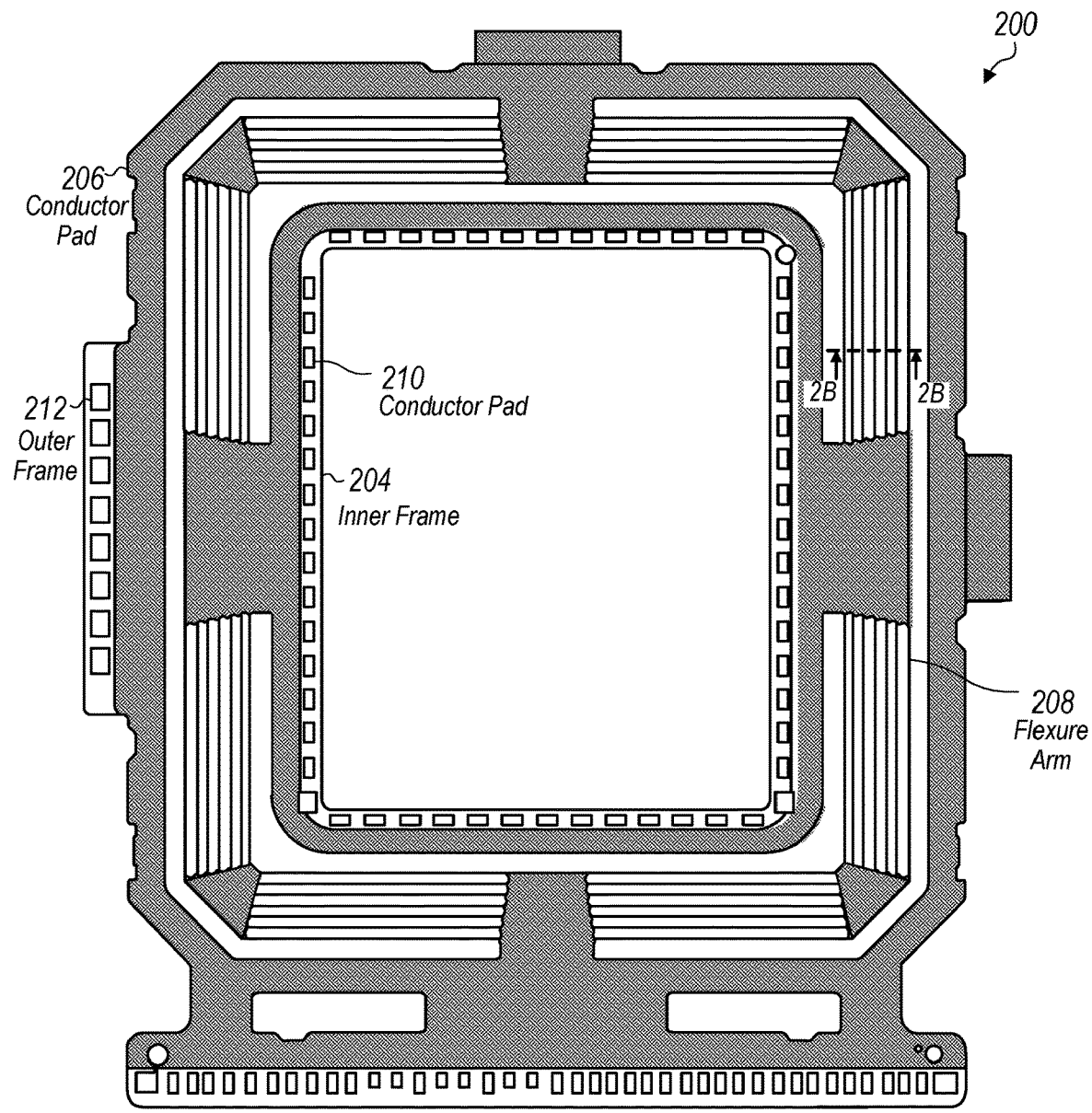
FIG. 2A shows a top view of an example suspension assembly, according to some embodiments.

FIG. 2A shows a top view of an example suspension assembly, according to some embodiments. In the shown examples, suspension assembly 200 may include inner frame 204 and outer frame 206, two of which may be connected through one or more flexure arms 208. In some embodiments, flexure arms 208 may be arranged along the perimeter of inner frame 204. In some embodiments, inner frame 204 and/or outer frame 206 may individually include one or more conductor pads 210 and 212, as shown in FIG. 2A, which may function as electrical connection points. For instance, in some embodiments, image sensor 202 may be surface mounted to inner frame 202 using conductor pads 210. As described above, electrical traces may be integrated with suspension assembly 200. For instance, one or more electrical traces may be routed at one or both sides of suspension assembly 200, e.g., together with flexure arms 208, from conductor pads 212 (of outer frame 206) to conductor pads 210 (of inner frame 210). As described above, suspension assembly 200 may be made from metal (which may be electrically conductive) to provide necessary mechanical strength. In some embodiments, suspension assembly 200 may be used to implement various AF and/or OIS functions for a camera. For instance, a transverse voice coil motor (e.g., transverse voice coil motor 120 in FIG. 1) may generate motive forces to move inner frame 204, together with image sensor 202, relative to outer frame 206 in one or more directions (e.g., along the X and/or Y axes). Therefore, inner frame 204 may be viewed as a dynamic platform, because it may be moveable with respect to outer frame 206 which may be viewed as a static platform.

Figure 2B:
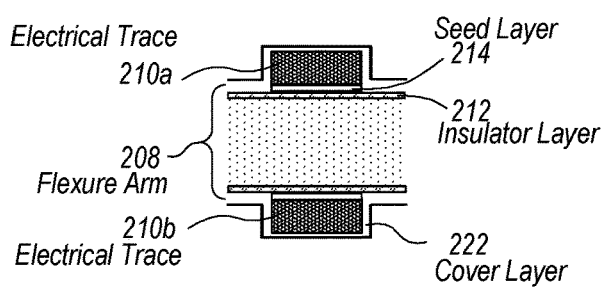
FIG. 2B shows a cross-sectional view of a flexure arm and electrical traces of an example suspension assembly, according to some embodiments.

FIG. 2B is a cross-sectional view of an flexure arm and electrical traces of the example suspension assembly, according to some embodiments. Note that, according to the indication in FIG. 2A, there may be multiple flexure arms in the cross-sectional view in FIG. 2B. For purposes of illustration, only one single flexure arm 208 is shown in FIG. 2B. As shown in FIG. 2B, there may be electrical traces at both sides of flexure arm 208. For instance, a first electrical trace 210a may be added at a first side of flexure arm 208, whilst a second electrical trace 210b may be added at a second side of flexure arm 208, where the second side faces opposite the first side of flexure arm 208. Note that electrical traces 210a and 210b may have the same or different sizes and/or shapes. Further, in some embodiments, electrical traces 210a and 210b may include the same or different electrically conductive materials. In some embodiments, electrical traces 210a and 210b may be used for different purposes. For instance, electrical trace 210a may be a larger trace used to deliver power, whilst electrical trace 210b may be a thinner trace for transferring signals. In addition, in some embodiments, instead of having electrical traces at both sides of flexure arm 208 (as shown in FIG. 2B), multiple electrical traces may be placed to the same side of flexure arm 208. For instance, the multiple electrical traces may be arranged side-by-side at one side of flexure arms 208. In another example, the multiple electrical traces may be stacked one on-top-of another at one side of flexure arms 208. In some embodiments, the above described various arrangements may be used in combination. For instance, one side of flexure arm 208 may have one or more electrical traces placed side-by-side, whilst the other side of flexure arm 208 may have one or more electrical traces stacked one on-top-of another.

As described above, flexure arm 208 may include metal, e.g., one or more copper alloys, in order to provide required mechanical stiffness. Thus, flexure arm 208 may be electrically conductive. Accordingly, there may be at least one insulator layer 212, including one or more dielectric materials such as polyamide, ABF, and so on, to provide electrical insulation between electrical traces 210a-210b and flexure arm 208, as shown in FIG. 2B. In some embodiments, there may be at least one seed layer 214 between insulator layer 212 and electrical traces 210a-210b. Seed layer 214 may include an electrically conductive material (e.g., copper and/or other conductive materials) to facilitate the addition of electrical traces 210a-210b to flexure arm 208, e.g., in an additive deposition process. In some embodiments, at least one cover layer 222 (e.g., an insulator layer) may be provided to cover electrical traces 210a-210b together with flexure arm 208 for rendering a further protection. Note that, although not shown, inner frame 204 and/or outer frame 206 of suspension assembly 200 may include similar structures. For instance, there may be one or more electrical traces at one or both sides of inner frame 204 and/or outer frame 206, separated by one or more insulator layers 212 and/or one or more seed layers 214. In addition, in some embodiments, there may be one or more connections through the body of inner frame 204 and/or outer frame 206, which may be insulated by one or more cavities, to serve as electrical connections for connecting the corresponding electrical traces at different sides of suspension assembly 200, as shown in FIGS. 3A-3I below.

Figure 3A:
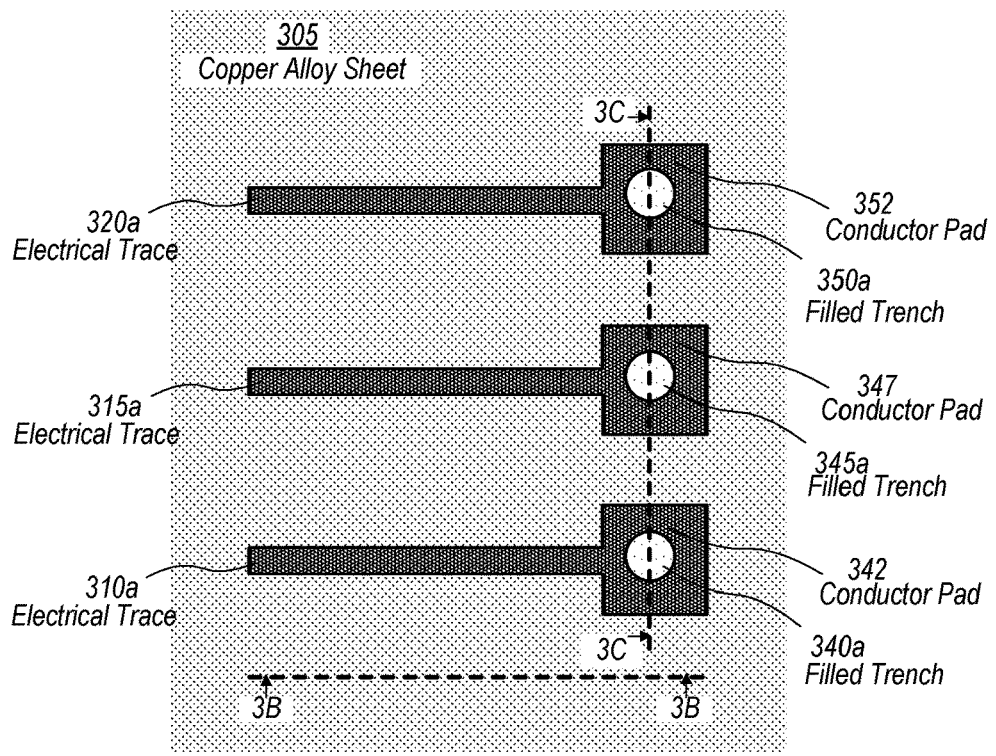
FIGS. 3A-3I show an example process to creating electrical traces and connections in a suspension assembly, according to some embodiments.
Figure 3B:
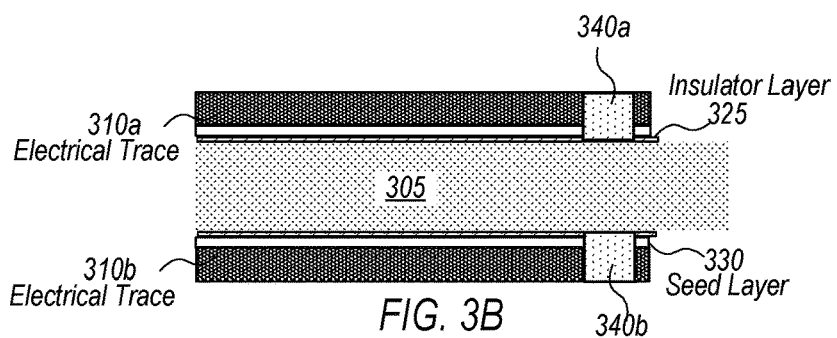
Figure 3C:
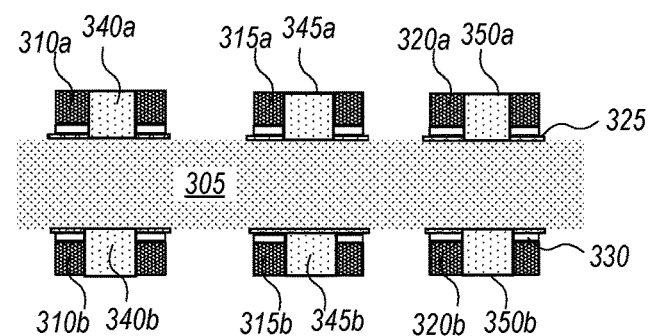

FIGS. 3A-3I show an example process to creating electrical traces and connections in a suspension assembly, according to some embodiments. FIGS. 3A-3C illustrate a top view and two corresponding cross-sectional views of the example process after forming electrical traces and trenches on both sides of a suspension assembly. For purposes of illustration, FIGS. 3A-3I illustrate a zoom-in view of a partial region within a frame (e.g., inner frame 204 in FIG. 2A) of the suspension assembly, e.g., a region within inner frame near one or more conductor pads (e.g., conductor pads 210 of inner frame 204). In other words, cavities (e.g., cavities 380, 385, and 390) serving as connections for electrical traces (e.g., electrical traces 310a-b, 315a-b, and 320a-b) at different sides of the frame may be formed fully within a frame (e.g., the cavities may be enclosed inside a border on all four sides of a rectangular frame even though, for purposes of illustration, some sections of the border may not be shown in the following figures) or may be formed at a region at one or more edges of a frame. In some embodiments, electrical traces (e.g., electrical traces 310a-310b, 315a-315b, and 320a-320b) may be added at both sides of substrate 305 which may be electrically conductive (e.g., a copper alloy sheet), using an additive manufacturing process. Substrate 305 may be used directly to form the frame. In some embodiments, substrate 305 (or the frame) may be covered with at least one insulator layer 325 (e.g., an insulator layer including polyamide, ABF, etc.), as shown in FIGS. 3B-3C. To form electrical traces 310-320 on substrate 305 (or the frame), seed layer 330 may first be applied to coat insulator layer 325 outside insulator layer 325, as shown in FIGS. 3B-3C. Next, a dry film photoresist (DFR), either negative or positive, may be applied to cover seed layer 330. Then, a photolithography process may be applied where exposing the DFR to light (e.g., ultraviolet (UV) light) through a patterned photomask (which may define the size and shapes of electrical traces). The area of the DFR exposed to the light may become dissolved, which may result in a patterned DFR layer that may expose seed layer 330 at the bottom of the pattern. Note that the above process may be applied to one side or both sides of substrate 305 (or the frame). Next, an electroforming process may be implemented which may apply a voltage across an anode and seed layer 330 to deposit metal (e.g., copper, nickel alloy, etc.) on exposed seed layer 330 to form electrical traces, e.g., electrical traces 310a-310b, 315a-315b, and 320a-320b at both sides of substrate 305 (or the frame), as shown in FIGS. 3A-3C. One or more similar processes may be used, e.g., before, at the same time, or after the forming of electrical traces 310-320, to create and fill trenches to form filled trenches 340a-340b, 345a-345b, and 350a-350b at conductor pads 342, 347, and 352 of substrate 305 (or the frame) to connect electrical traces 310-320 to substrate 305. In FIGS. 3A-3C, filled trenches 340-350 are shown in circles (e.g., like filled holes). In some embodiments, filled trenches 340-350 may have other different shapes, e.g., rectangular prisms, triangle prisms, etc. Further, filled trenches 340-350 may have the same or different sizes and/or shapes from each other. Finally, the remaining DFR material may be stripped away or removed, and the remaining seed layer 330 (not covered by electrical traces 310-320) may be etched to isolate electrical traces 310a (and 310b), 315a (and 315b), and 320a (and 320b) from each other. By controlling the photolithography and/or deposition processes, electrical traces 310-320 and trenches 340-350 may be created in various sizes, shapes and/or materials. Note that the materials of substrate 305, electrical traces 310-320, and/or filled trenches 342, 347 and 352 may be the same or different from each other.

Figure 3D:
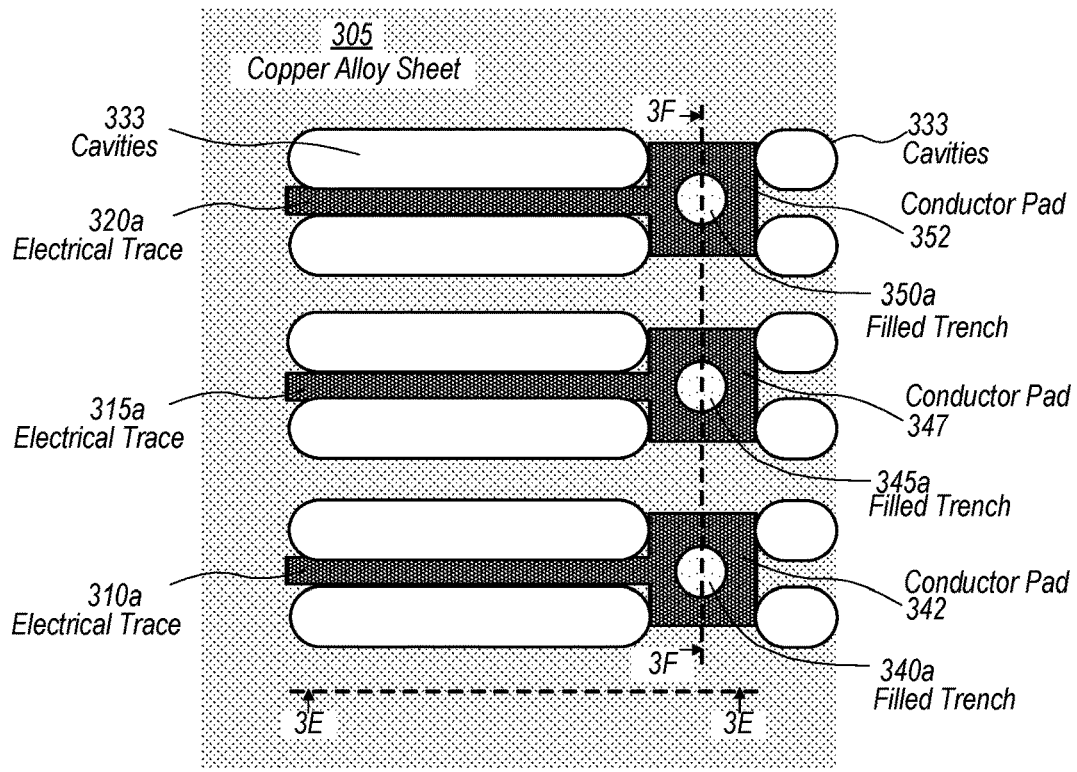
Figure 3E:
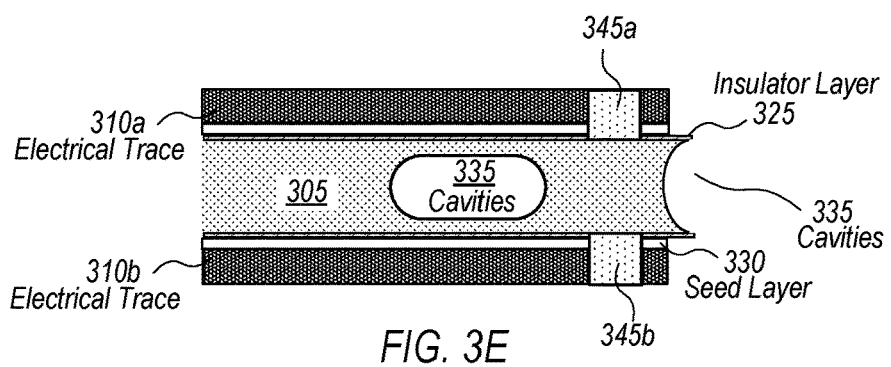
Figure 3F:
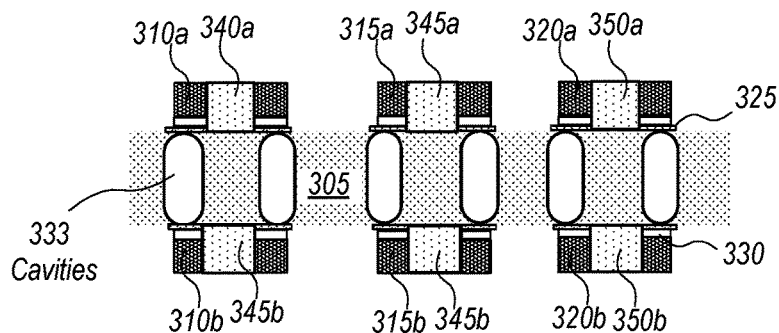

FIGS. 3D-3F illustrate a top view and two corresponding cross-sectional views of the example process after an initial removal of the material of substrate 305, according to some embodiments. In some embodiments, after electrical traces 310-320 have been formed at both sides of substrate 305, one or more parts of substrate 305 may be initially removed. For instance, as shown in the top view of FIG. 3D, the material of substrate 305 in areas surrounding electrical traces 310-320 may be removed to create cavities 333, according to some embodiments. Further, in some embodiments, one or more parts of substrate 305 may be removed to create one or more cavities 335 in the body of substrate 305. In some embodiments, cavities 335 may be created at locations corresponding to filled trenches 340, 345, and 350. For instance, as shown in FIG. 3E, cavities 335 may be created such that a remaining part of substrate 305 surrounded by cavities 335 (e.g., a bus bar) may be created at a locate in between filled trenches 345a-345b, and similar bus bars may be created at similar locations corresponding to filled trenches 345a-345b and 350a-350b. This initial removal, as compared to the final removal in FIGS. 3G-3I, may be a relatively coarse removal process requiring a lower precision. In some embodiments, the locations of the parts removed for creating cavities 333 and 335 may be determined using a photolithography process, and the partial removal of the material of substrate 305 may be implemented using an etching process to dissolve or wash away the removed parts of substrate 305 with an etchant.

Figure 3G:
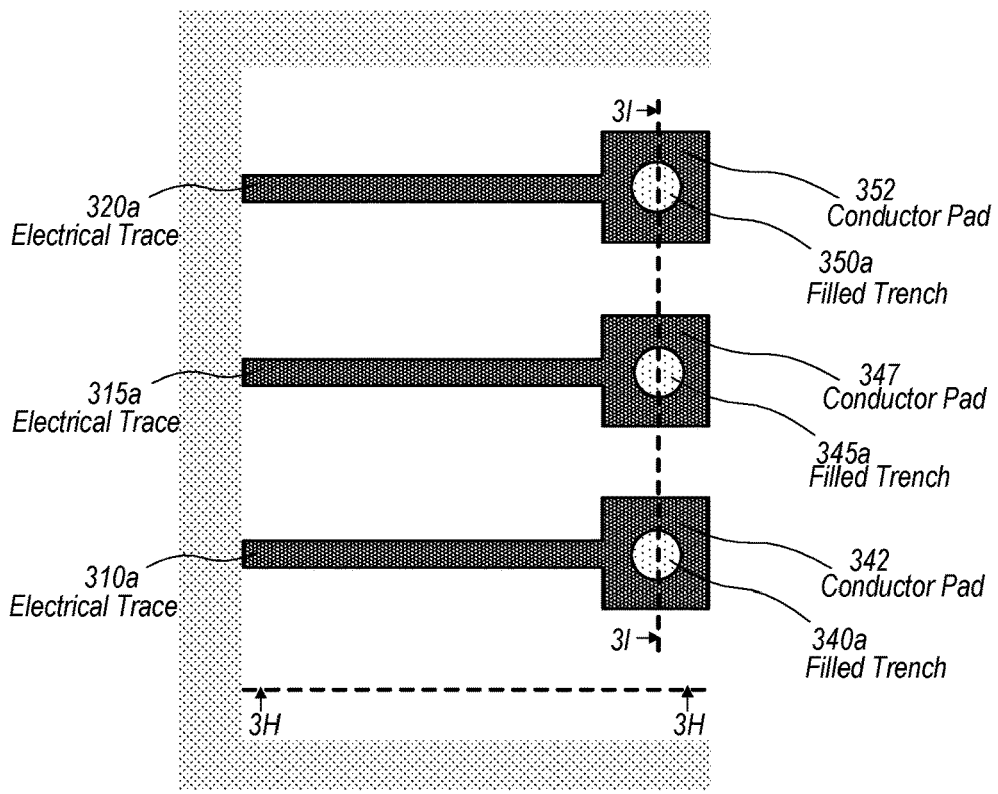
Figure 3H:
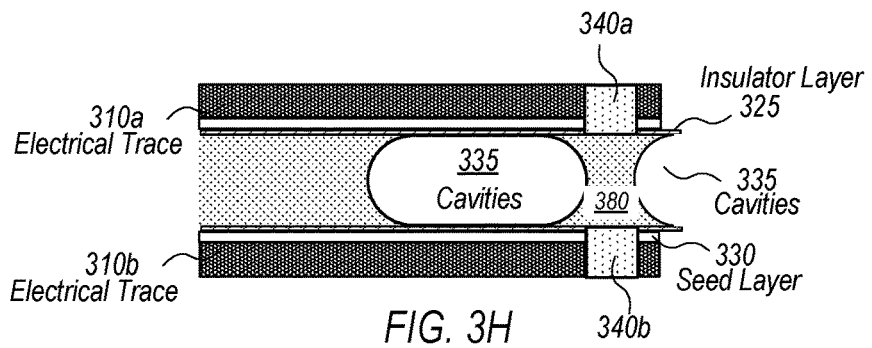
Figure 3I:
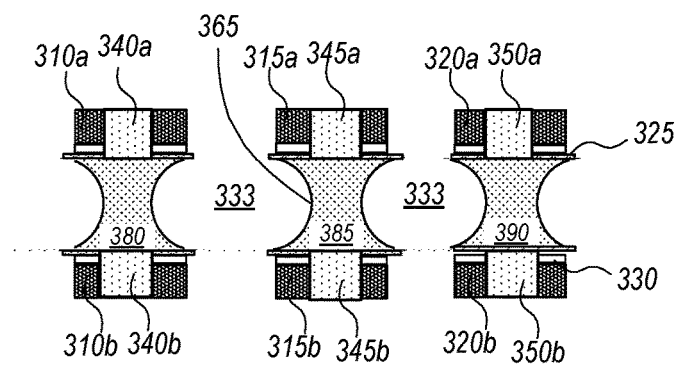

FIGS. 3G-3I illustrate a top view and two corresponding cross-sectional views of the suspension assembly after creating connections through the body of the suspension assembly for connecting electrical traces at both sides of the suspension assembly, according to some embodiments. As shown in FIGS. 3G and 3I, in some embodiments, one or more parts of substrate 305 may be further removed such that cavities 333 may be expanded, e.g., towards left and right in FIG. 3I. Similarly, in some embodiments, cavities 335 may be increased, e.g., towards top and bottom and/or right and left in FIG. 3H, to fully isolate remaining parts 380, 385, and 390 of substrate 305 (e.g., the bus bars) from the rest of the body of substrate 305. Note that, in some embodiments, remaining parts 380, 385, and 390 may connect to filled trenches 340, 345, and 350, respectively. Thus, remaining parts 380-390 (surrounded and insulated by cavities 333 and 335), together with filled trenches 340-350, may form electrical connections for connecting electrical traces 310a-310b, 315a-315b, and 320a-320b at the different sides of substrate 305 (e.g., the frame), respectively. In some embodiments, cavities 333 and/or 335 may be filled with one or more dielectric materials (not shown) to further protect and/or insulate remaining parts 380-390 (the bus bars). Note that, in FIGS. 3H-3I, remaining parts 380-390 (e.g., the bus bars) are shown to include an hourglass shape in some cross-sectional views. In some embodiments, remaining parts 380-390 (the bus bars) may be created in various sizes and shapes. Compared to the initial removal in FIGS. 3D-3F, the final removal in FIGS. 3G-3I may require a higher precision to create cavities 333 and/or 335 to insulate remaining parts 380-390 from the rest of the body of substrate 305 (e.g., the inner frame). In some embodiments, the initial removal in FIGS. 3D-3F and final removal in FIGS. 3G-3I may not necessarily be separate steps, but instead be combined together in the same steps.

Figure 4:
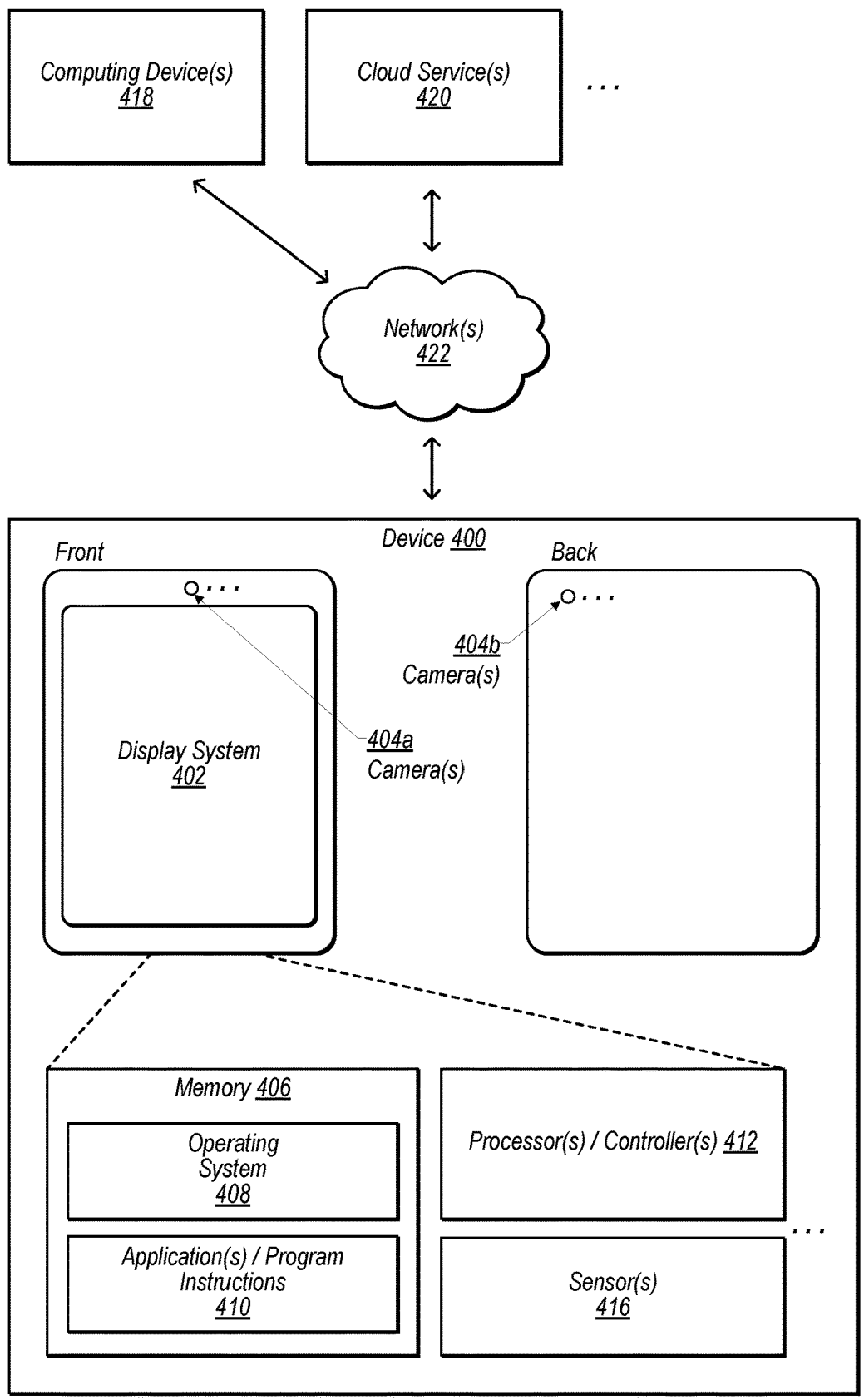
FIG. 4 shows a schematic representation of an example device 400 that may include a camera which may include one or more suspension assemblies, in accordance with some embodiments.

FIG. 4 illustrates a schematic representation of an example device 400 that may include a camera which may include one or more suspension assemblies, in accordance with some embodiments. In some embodiments, the device 400 may be a mobile device and/or a multifunction device. In various embodiments, the device 400 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 400 may include a display system 402 (e.g., comprising a display and/or a touch-sensitive surface) and/or one or more cameras 404. In some non-limiting embodiments, the display system 402 and/or one or more front-facing cameras 404a may be provided at a front side of the device 400, e.g., as indicated in FIG. 4. Additionally, or alternatively, one or more rear-facing cameras 404b may be provided at a rear side of the device 400. In some embodiments comprising multiple cameras 404, some or all of the cameras may be the same as, or similar to, each other. Additionally, or alternatively, some or all of the cameras may be different from each other. In various embodiments, the location(s) and/or arrangement(s) of the camera(s) 404 may be different than those indicated in FIG. 4.

Among other things, the device 400 may include memory 406 (e.g., comprising an operating system 408 and/or application(s)/program instructions 410), one or more processors and/or controllers 412 (e.g., comprising CPU(s), memory controller(s), display controller(s), and/or camera controller(s), etc.), and/or one or more sensors 416 (e.g., orientation sensor(s), proximity sensor(s), and/or position sensor(s), etc.). In some embodiments, the device 400 may communicate with one or more other devices and/or services, such as computing device(s) 418, cloud service(s) 420, etc., via one or more networks 422. For example, the device 400 may include a network interface (e.g., network interface 510) that enables the device 400 to transmit data to, and receive data from, the network(s) 422. Additionally, or alternatively, the device 400 may be capable of communicating with other devices via wireless communication using any of a variety of communications standards, protocols, and/or technologies.

Figure 5:
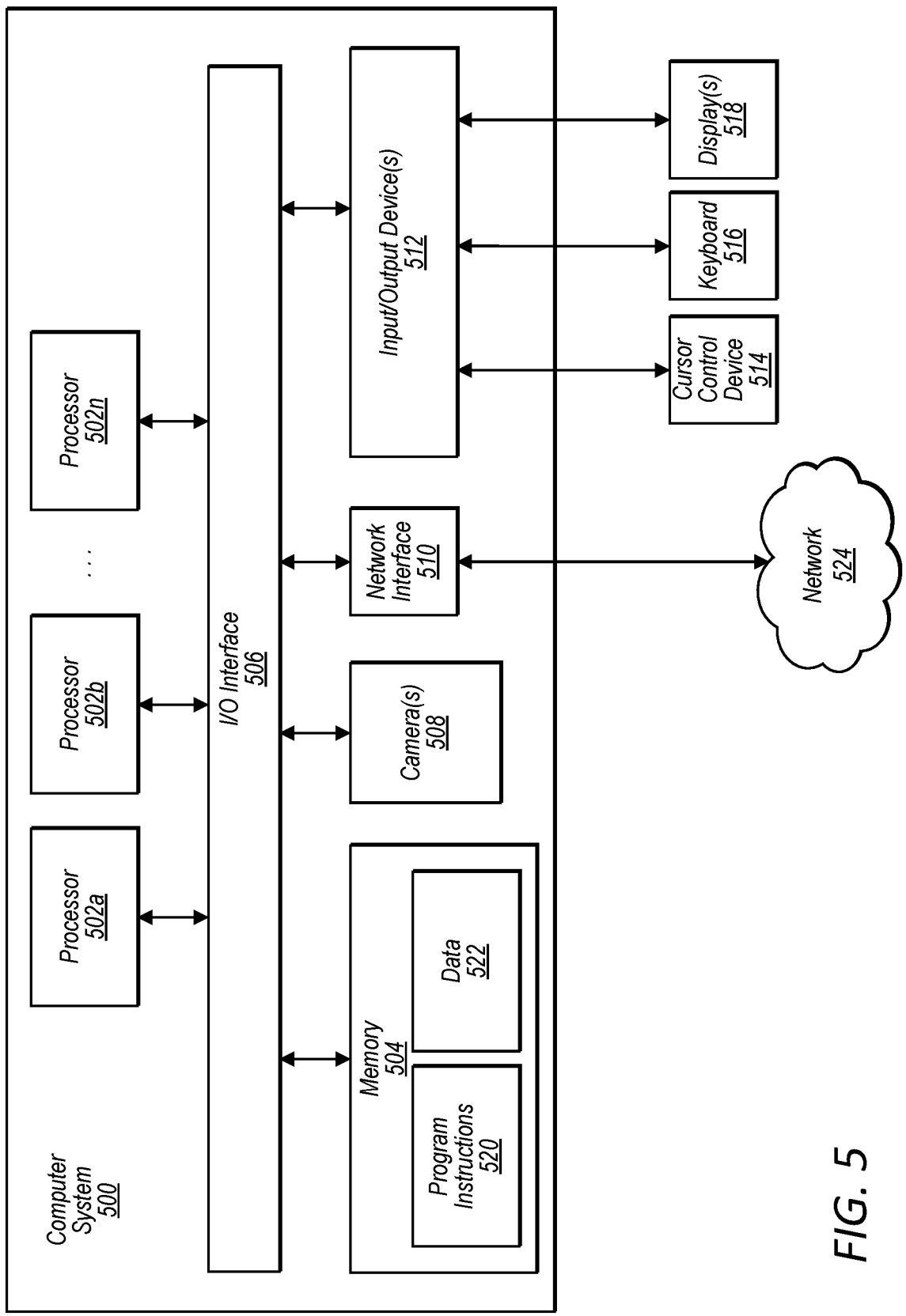
FIG. 5 shows a schematic block diagram of an example computing device that may include a camera having one or more suspension assemblies, according to some embodiments.

FIG. 5 illustrates a schematic block diagram of an example computing device, referred to as computer system 500, that may include a camera having one or more suspension assemblies, e.g., as described herein with reference to FIGS. 1-4. In addition, computer system 500 may implement methods for controlling operations of the camera and/or for performing image processing images captured with the camera. In some embodiments, the device 400 (described herein with reference to FIG. 4) may additionally, or alternatively, include some or all of the functional components of the computer system 500 described herein.

The computer system 500 may be configured to execute any or all of the embodiments described above. In different embodiments, computer system 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 500 includes one or more processors 502 coupled to a system memory 504 via an input/output (I/O) interface 506. Computer system 500 further includes one or more cameras 508 coupled to the I/O interface 506. Computer system 500 further includes a network interface 510 coupled to I/O interface 506, and one or more input/output devices 512, such as cursor control device 514, keyboard 516, and display(s) 518. In some cases, it is contemplated that embodiments may be implemented using a single instance of computer system 500, while in other embodiments multiple such systems, or multiple nodes making up computer system 500, may be configured to host different parts or instances of embodiments. For example, in one embodiment some elements may be implemented via one or more nodes of computer system 500 that are distinct from those nodes implementing other elements.

In various embodiments, computer system 500 may be a uniprocessor system including one processor 502, or a multiprocessor system including several processors 502 (e.g., two, four, eight, or another suitable number). Processors 502 may be any suitable processor capable of executing instructions. For example, in various embodiments processors 502 may be general-purpose or embedded processors implementing any of a variety of instruction set architectures (ISAs), such as the x86, PowerPC, SPARC, or MIPS ISAs, or any other suitable ISA. In multiprocessor systems, each of processors 502 may commonly, but not necessarily, implement the same ISA.

System memory 504 may be configured to store program instructions 520 accessible by processor 502. In various embodiments, system memory 504 may be implemented using any suitable memory technology, such as static random access memory (SRAM), synchronous dynamic RAM (SDRAM), nonvolatile/Flash-type memory, or any other type of memory. Additionally, existing camera control data 522 of memory 504 may include any of the information or data structures described above. In some embodiments, program instructions 520 and/or data 522 may be received, sent or stored upon different types of computer-accessible media or on similar media separate from system memory 504 or computer system 500. In various embodiments, some or all of the functionality described herein may be implemented via such a computer system 500.

In one embodiment, I/O interface 506 may be configured to coordinate I/O traffic between processor 502, system memory 504, and any peripheral devices in the device, including network interface 510 or other peripheral interfaces, such as input/output devices 512. In some embodiments, I/O interface 506 may perform any necessary protocol, timing or other data transformations to convert data signals from one component (e.g., system memory 504) into a format suitable for use by another component (e.g., processor 502). In some embodiments, I/O interface 506 may include support for devices attached through various types of peripheral buses, such as a variant of the Peripheral Component Interconnect (PCI) bus standard or the Universal Serial Bus (USB) standard, for example. In some embodiments, the function of I/O interface 506 may be split into two or more separate components, such as a north bridge and a south bridge, for example. Also, in some embodiments some or all of the functionality of I/O interface 506, such as an interface to system memory 504, may be incorporated directly into processor 502.

Network interface 510 may be configured to allow data to be exchanged between computer system 500 and other devices attached to a network 524 (e.g., carrier or agent devices) or between nodes of computer system 500. Network 524 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 510 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 512 may, in some embodiments, include one or more display terminals, keyboards, keypads, touchpads, scanning devices, voice or optical recognition devices, or any other devices suitable for entering or accessing data by one or more computer systems 500. Multiple input/output devices 512 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 510.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or parts of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
    forming a suspension assembly for a camera, wherein the suspension assembly comprises one or more flexure arms that connect a dynamic platform with a static platform, and wherein the forming the suspension assembly comprises:
        adding a first electrical trace at a first side of a conductive substrate;
        adding a second electrical trace at a second side of the conductive substrate, wherein the second side faces opposite the first side; and
        removing one or more parts of the conductive substrate to create one or more cavities such that a remaining part of conductive substrate surrounded by the one or more cavities forms at least part of a connection between the first and second electrical traces respectively at the first and second sides of the conductive substrate.

2. The method of claim 1, wherein the conductive substrate comprises at least one insulator layer between the first electrical trace and the conductive substrate and between the second electrical trace and the conductive substrate, and wherein the forming the suspension assembly further comprises:
    creating a first trench through the at least one insulator layer between the first electrical trace and the conductive substrate at the first side of the conductive substrate;
    creating a second trench through the at least one insulator layer between the first electrical trace and the conductive substrate at the second side of the conductive substrate; and
    adding an electrically conductive material in to the first and second trenches which connects the first and second traces to the conductive substrate.

3. The method of claim 2, wherein the at least one layer comprises a polyamide or ajinomoto build-up film (ABF) insulator layer.

4. The method of claim 1, wherein adding the first and second electrical traces respectively at the first and second sides of the conductive substrate comprises using an additive manufacturing process to deposit an electrically conductive material to form the first and second electrical traces respectively at the first and second sides of the conductive substrate.

5. The method of claim 4, wherein the additive manufacturing process comprises using photolithography process to create a pattern through a dry film photoresist layer of the conductive substrate and depositing the electrically conductive material according to the pattern to form the first and second electrical traces.

6. The method of claim 1, wherein the conductive substrate comprises a copper alloy.

7. The method of claim 1, wherein the first and second electrical traces comprise copper.

8. The method of claim 1, wherein removing the one or more parts of the conductive substrate comprises using an etching process to remove the one or more parts of the conductive substrate.

9. The method of claim 1, wherein the suspension assembly connects a dynamic platform of an image sensor of the camera to a static platform such that the dynamic platform, together with the image sensor, is moveable in one or more directions relative to at least one optical lens of the camera.

10. A camera, comprising:
    at least one optical lens;
    an image sensor; and
    a suspension assembly configured as part of at least one of an optical image stabilization system or an autofocus system of the camera,
    wherein the suspension assembly includes at least one frame having a conductive substrate with a first electrical trace at a first side of the conductive substrate and a second electrical trace at a second side of the conductive substrate facing opposite the first side, wherein the conductive substrate is formed from a first material, wherein a first portion of a first material of the conductive substrate is electrically isolated from a second portion of the first material of the conductive substrate by one or more cavities, and wherein the first portion of the first material of the conductive substrate forms at least part of a connection between the first and second electrical traces respectively at the first and second sides of the conductive substrate.

11. The camera of claim 10, wherein the conductive substrate comprises at least one insulator layer between the first electrical trace and the conductive substrate and between the second electrical trace and the conductive substrate, and wherein the at least one frame of the suspension assembly includes:
    a first trench through the at least one insulator layer between the first electrical trace and the conductive substrate at the first side of the conductive substrate; and
    a second trench through the at least one insulator layer between the first electrical trace and the conductive substrate at the second side of the conductive substrate,
    wherein the first and second trenches are filled with an electrically conductive material which connects the first and second electrical traces to the conductive substrate.

12. The camera of claim 11, wherein the at least one insulator layer comprises a polyamide or ABF insulator layer.

13. The camera of claim 10, wherein the first and second electrical traces are added at the first and second sides of the conductive substrate according to an additive manufacturing process.

14. The camera of claim 13, wherein the additive manufacturing process comprises using photolithography process to create a pattern through a dry film photoresist layer of the conductive substrate and depositing an electrically conductive material according to the pattern to form the first and second electrical traces.

15. The camera of claim 10, wherein the conductive substrate comprises a copper alloy.

16. The camera of claim 10, wherein the first and second electrical traces comprise copper.

17. The camera of claim 10, wherein the one or more cavities are created by removing one or more parts of the conductive substrate using an etching process.

18. The camera of claim 10, wherein the image sensor of the camera is mounted to the at least one frame of the suspension assembly, and wherein the at least one frame is configured be moveable with the image sensor in one or more directions relative to the at least one lens of the camera.

19. A method, comprising:

depositing an electrically conductive material at a first side of a conductive substrate to form a first electrical trace;

depositing the electrically conductive material at a second side of the conductive substrate to form a second electrical trace, wherein the second side faces opposite the first side;

etching a body of the conductive substrate partially to create one or more cavities such that a remaining part of the conductive substrate surrounded by the one or more cavities forms at least part of a connection between the first and second electrical traces.

20. The method of claim 19, further comprising:

creating a first trench through at least one insulator layer between the first electrical trace and the conductive substrate at the first side of the conductive substrate;

creating a second trench through the at least one insulator layer between the first electrical trace and the conductive substrate at the second side of the conductive substrate; and depositing another electrically conductive material in to the first and second trenches which connects the first and second electrical traces to the conductive substrate.

* * * * *